(12) United States Patent
McNamara et al.

(10) Patent No.: US 7,444,133 B1
(45) Date of Patent: Oct. 28, 2008

(54) CELL BROADCAST UPDATES TO APPLICATION SOFTWARE

(75) Inventors: Justin McNamara, Atlanta, GA (US); Jeffrey Clinton Mikan, Cumming, GA (US); Carolyn Tuthill, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 333 days.

(21) Appl. No.: 11/265,602

(22) Filed: Nov. 1, 2005

(51) Int. Cl.
*H04M 1/66* (2006.01)
*H04M 1/68* (2006.01)
*H04M 3/42* (2006.01)
*H04Q 7/22* (2006.01)
*H04Q 7/38* (2006.01)
*H04Q 7/20* (2006.01)

(52) U.S. Cl. .................. 455/411; 455/456.3; 455/414.1

(58) Field of Classification Search .................. 370/259, 370/270, 338; 455/410, 411, 414.1–414.3, 455/456.3; 709/219; 725/62
See application file for complete search history.

(56) References Cited

U.S. PATENT DOCUMENTS

| | | | |
|---|---|---|---|
| 6,097,949 A | 8/2000 | Jung et al. | |
| 6,449,719 B1 * | 9/2002 | Baker | 713/168 |
| 6,493,559 B1 | 12/2002 | Pecen et al. | |
| 6,556,835 B1 * | 4/2003 | Raivisto | 455/466 |
| 7,096,044 B2 | 8/2006 | Gil et al. | |
| 7,123,719 B2 * | 10/2006 | Sowa et al. | 380/247 |
| 7,254,614 B2 | 8/2007 | Mulligan et al. | |
| 7,269,146 B2 | 9/2007 | Pecen et al. | |
| 7,289,788 B2 | 10/2007 | Shan | |
| 2001/0005670 A1 | 6/2001 | Lahtinen | |
| 2003/0007499 A1 | 1/2003 | Rajahalme | |
| 2003/0208613 A1 * | 11/2003 | Signes et al. | 709/231 |
| 2004/0038645 A1 | 2/2004 | Rcunamaki et al. | |
| 2004/0081192 A1 | 4/2004 | Koulakiotis et al. | |

(Continued)

FOREIGN PATENT DOCUMENTS

GB  2407002  4/2005

(Continued)

OTHER PUBLICATIONS

David Gundlegård, "Automotive Telematics Services based on Cell Broadcast," Master's thesis, Department of Science and Technology, Linköping University, Norrköping, Sweden, May 8, 2003, 55 pages.

(Continued)

*Primary Examiner*—Lester Kincaid
*Assistant Examiner*—Nathan Mitchell
(74) *Attorney, Agent, or Firm*—Zagorin O'Brien Graham LLP

(57) ABSTRACT

A system for providing information services via broadcast messages to mobile stations and other devices. The broadcast messages are encrypted prior to being communicated to devices within a geographic area. A client application retrieves cryptographic keys associated with the information services to which a customer is subscribed. When the mobile station or device receives encrypted broadcast messages, the client application determines if it has the cryptographic key to decrypt the message. If so, the information contained in the message is displayed. If not, then the message is ignored by the mobile station. The information may be used to provide or retrieve near real time information from devices to provide such services as traffic alters, fleet management, etc.

28 Claims, 2 Drawing Sheets

U.S. PATENT DOCUMENTS

| | | |
|---|---|---|
| 2004/0106396 A1 | 6/2004 | Segura et al. |
| 2004/0110462 A1 | 6/2004 | Forstadius |
| 2004/0204092 A1 | 10/2004 | Sato |
| 2005/0037728 A1 | 2/2005 | Binzel et al. |
| 2005/0117743 A1* | 6/2005 | Bender et al. .................. 380/28 |
| 2005/0266864 A1* | 12/2005 | Chen et al. .................. 455/466 |
| 2006/0007920 A1* | 1/2006 | Michel et al. ............... 370/352 |
| 2006/0025157 A1 | 2/2006 | Kuwahara et al. |
| 2006/0069746 A1 | 3/2006 | Davis et al. |
| 2006/0092953 A1* | 5/2006 | Haverinen et al. .......... 370/400 |
| 2006/0107287 A1 | 5/2006 | Lee et al. |
| 2006/0155698 A1 | 7/2006 | Vayssiere |
| 2006/0223499 A1 | 10/2006 | Pecen et al. |
| 2006/0265489 A1 | 11/2006 | Moore |
| 2006/0293028 A1* | 12/2006 | Gadamsetty et al. ........ 455/411 |

FOREIGN PATENT DOCUMENTS

| | | |
|---|---|---|
| WO | 9966747 | 12/1999 |
| WO | 0172062 | 9/2001 |

OTHER PUBLICATIONS

Search Report dated Mar. 16, 2007 (Application No. PCT/US2006/041742).

U.S. Appl. No. 11/265,601, filed Nov. 1, 2005, entitled, "Cell Broadcast Via Encoded Message to an Embedded Client," naming inventors Justin McNamara, Jeffrey Mikan and Carolyn Tuthill.

* cited by examiner

CELL BROADCAST UPDATES TO APPLICATION SOFTWARE

FIELD OF THE INVENTION

The present invention is directed to wireless services. In particular, the present invention is directed to a system for providing information to applications running on a mobile station or other devices.

BACKGROUND OF THE INVENTION

Global system for mobile communication (GSM) is one of the most widely used wireless access systems in today's fast growing communication systems. GSM provides circuit-switched data services to subscribers, such as mobile telephone or computer users. General Packet Radio Service (GPRS), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications.

Conventional GSM systems provide for broadcast services, such as cell broadcast. When a cell broadcast is made, all clients of such systems receive the broadcast message. Conventional systems are unable to place limitations on which clients are able/authorized to receive specific broadcast messages. This prevents providers from determining which subscribers are actually listening to the message and from authenticating who may receive the broadcast messages. Having such capabilities would allow wireless providers to disseminate information quickly to large numbers of mobile clients without requiring large amounts of overhead, while being able to charge for such services to recover costs.

SUMMARY OF THE INVENTION

A system provides information services via broadcast messages to mobile stations and other devices. The broadcast messages are encrypted prior to being communicated to devices within a geographic area. A client application retrieves cryptographic keys associated with the information services to which a customer is subscribed. When the mobile station or device receives encrypted broadcast messages, the client application determines if it has the cryptographic key to decrypt the message. If so, the information contained in the message is displayed. If not, then the message is ignored by the mobile station. The information may be used to provide or retrieve near real time information from devices to provide such services as traffic alerts, fleet management, etc.

The wireless network includes a push proxy gateway (PPG), a short message peer to peer (SMPP) router that receives SMPP messages from the push proxy gateway and converts the SMPP messages to cell broadcast messages, and a cell broadcast center that communicates the cell broadcast messages to the client application. The wireless network may push information to devices based on changing events, e.g., traffic accidents, weather events, etc.

Additional features of the invention are described below.

DETAILED DESCRIPTION OF ILLUSTRATIVE EMBODIMENTS

Figure 1:
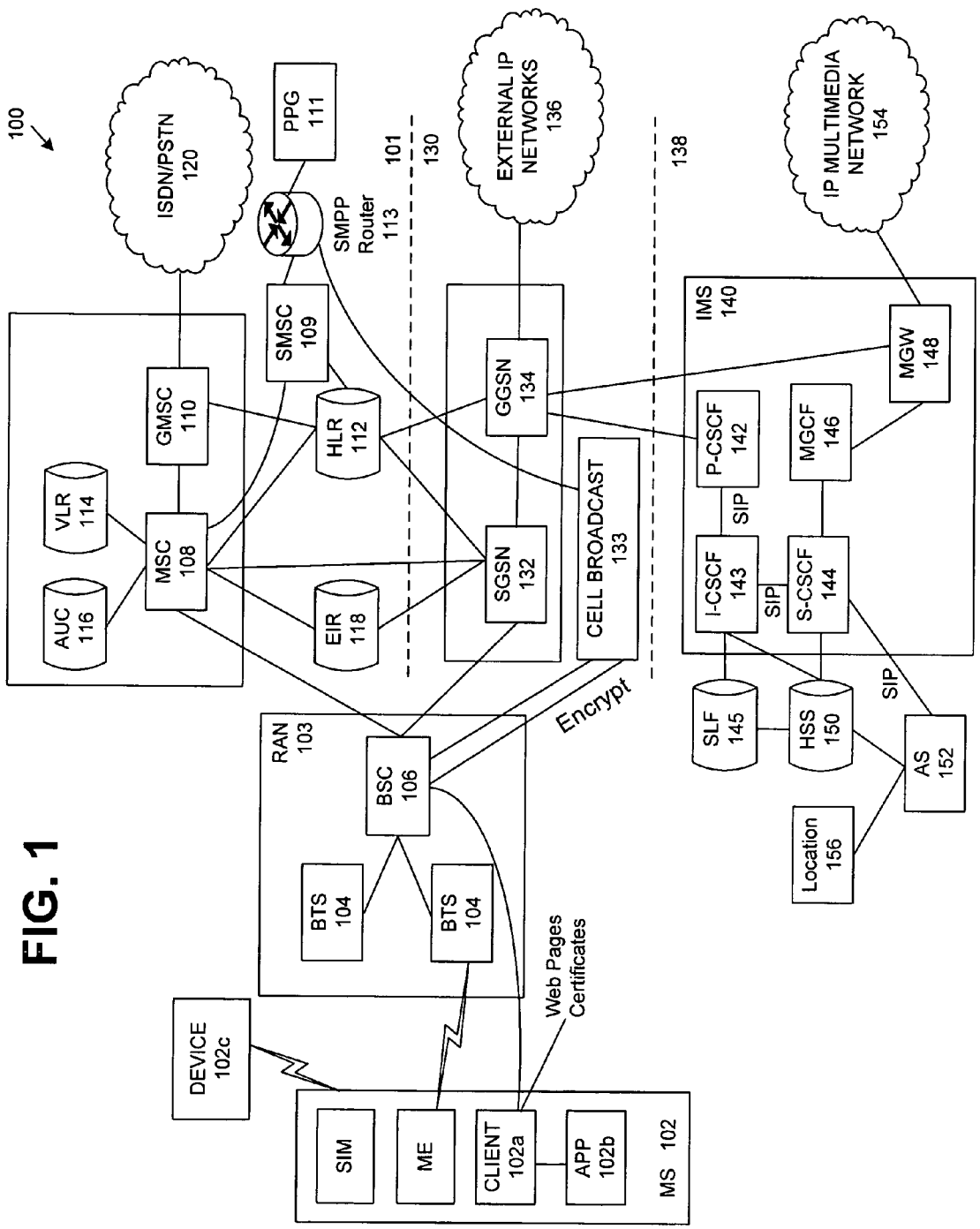
FIG. 1 illustrates an exemplary GSM/GPRS/IP multimedia network architecture.

FIG. 1 shows a GSM/GPRS/IP multimedia network architecture 100 that includes a GSM core network 101, a GPRS network 130 and an IP multimedia network 138. The GSM core network 101 includes a Mobile Station (MS) 102, at least one Base Transceiver Station (BTS) 104 and a Base Station Controller (BSC) 106. The MS 102 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The MS 102 includes an embedded client 102a that receives and processes messages received by the MS 102. The embedded client 102a may be implemented in JAVA and is discussed more fully below.

The embedded client 102a communicates with an application 102b that provides services and/or information to an end user. One example of the application may be navigation software that provides near real-time traffic information that is received via the embedded client 102a to the end user. The navigation software may provide road conditions, suggest alternate routes, etc. based on the location of the MS 102. Those of ordinary skill in the art understand that there are many different methods and systems of locating an MS 102.

Alternatively, the MS 102 and a device 102c may be enabled to communicate via a short-range wireless communication link, such as BLUETOOTH. For example, a BLUETOOTH SIM Access Profile may be provided in an automobile (i.e., device 102c) that communicates with the SIM in the MS 102 to enable the car's communications system to pull information from the MS 102. The BLUETOOTH communication system in the car becomes an "embedded phone," using the car's antenna. The result is improved reception of calls made in the car. As one of ordinary skill in the art would recognize, an automobile is one example of the device 102c. There may be an endless number of devices 102c that use the SIM within the MS 102 to provide services, information, data, audio, video, etc. to end users.

The BTS 104 is physical equipment, such as a radio tower, that enables a radio interface to communicate with the MS. Each BTS may serve more than one MS. The BSC 106 manages radio resources, including the BTS. The BSC may be connected to several BTSs. The BSC and BTS components, in combination, are generally referred to as a base station (BSS) or radio access network (RAN) 103.

The GSM core network 101 also includes a Mobile Switching Center (MSC) 108, a Gateway Mobile Switching Center (GMSC) 110, a Home Location Register (HLR) 112, Visitor Location Register (VLR) 114, an Authentication Center (AuC) 118, and an Equipment Identity Register (EIR) 116. The MSC 108 performs a switching function for the network. The MSC also performs other functions, such as registration, authentication, location updating, handovers, and call routing. The GMSC 110 provides a gateway between the GSM network and other networks, such as an Integrated Services Digital Network (ISDN) or Public Switched Telephone Networks (PSTNs) 120. In other words, the GMSC 110 provides interworking functionality with external networks.

The HLR 112 is a database that contains administrative information regarding each subscriber registered in a corresponding GSM network. The HLR 112 also contains the current location of each MS. The VLR 114 is a database that contains selected administrative information from the HLR 112. The VLR contains information necessary for call control and provision of subscribed services for each MS currently located in a geographical area controlled by the VLR. The HLR 112 and the VLR 114, together with the MSC 108, provide the call routing and roaming capabilities of GSM. The AuC 116 provides the parameters needed for authentication and encryption functions. Such parameters allow verification of a subscriber's identity. The EIR 118 stores security-sensitive information about the mobile equipment.

A Short Message Service Center (SMSC) 109 allows one-to-one Short Message Service (SMS) messages to be sent to/from the MS 102. A Push Proxy Gateway (PPG) 111 is used to "push" (i.e., send without a synchronous request) content to the MS 102. The PPG 111 acts as a proxy between wired and wireless networks to facilitate pushing of data to the MS 102. A Short Message Peer to Peer (SMPP) protocol router 113 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 102 sends a location update including its current location information to the MSC/VLR, via the BTS 104 and the BSC 106. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 130 is logically implemented on the GSM core network architecture by introducing two packet-switching network nodes, a serving GPRS support node (SGSN) 132, a cell broadcast and a Gateway GPRS support node (GGSN) 134. The SGSN 132 is at the same hierarchical level as the MSC 108 in the GSM network. The SGSN controls the connection between the GPRS network and the MS 102. The SGSN also keeps track of individual MS's locations and security functions and access controls.

A Cell Broadcast Center (CBC) 133 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 134 provides a gateway between the GPRS network and a public packet network (PDN) or other IP networks 136. That is, the GGSN provides interworking functionality with external networks, and sets up a logical link to the MS through the SGSN. When packet-switched data leaves the GPRS network, it is transferred to an external TCP-IP network 136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 130 can be designed to operate in three network operation modes (NOM1, NOM2 and NOM3). A network operation mode of a GPRS network is indicated by a parameter in system information messages transmitted within a cell. The system information messages dictate a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel. In a NOM3 network, a MS can monitor pages for a circuit switched network while receiving data and vise versa.

The IP multimedia network 138 was introduced with 3GPP Release 5, and includes an IP multimedia subsystem (IMS) 140 to provide rich multimedia services to end users. A representative set of the network entities within the IMS 140 are a call/session control function (CSCF), a media gateway control function (MGCF) 146, a media gateway (MGW) 148, and a master subscriber database, called a home subscriber server (HSS) 150. The HSS 150 may be common to the GSM network 101, the GPRS network 130 as well as the IP multimedia network 138.

The IP multimedia system 140 is built around the call/session control function, of which there are three types: an interrogating CSCF (I-CSCF) 143, a proxy CSCF (P-CSCF) 142, and a serving CSCF (S-CSCF) 144. The P-CSCF 142 is the MS's first point of contact with the IMS 140. The P-CSCF 142 forwards session initiation protocol (SIP) messages received from the MS to an SIP server in a home network (and vice versa) of the MS. The P-CSCF 142 may also modify an outgoing request according to a set of rules defined by the network operator (for example, address analysis and potential modification).

The I-CSCF 143, forms an entrance to a home network and hides the inner topology of the home network from other networks and provides flexibility for selecting an S-CSCF. The I-CSCF 143 may contact a subscriber location function (SLF) 145 to determine which HSS 150 to use for the particular subscriber, if multiple HSS's 150 are present. The S-CSCF 144 performs the session control services for the MS 102. This includes routing originating sessions to external networks and routing terminating sessions to visited networks. The S-CSCF 144 also decides whether an application server (AS) 152 is required to receive information on an incoming SIP session request to ensure appropriate service handling. This decision is based on information received from the HSS 150 (or other sources, such as an application server 152). The AS 152 also communicates to a location server 156

(e.g., a Gateway Mobile Location Center (GMLC)) that provides a position (e.g., latitude/longitude coordinates) of the MS 102.

The HSS 150 contains a subscriber profile and keeps track of which core network node is currently handling the subscriber. It also supports subscriber authentication and authorization functions (AAA). In networks with more than one HSS 150, a subscriber location function provides information on the HSS 150 that contains the profile of a given subscriber.

The MGCF 146 provides interworking functionality between SIP session control signaling from the IMS 140 and ISUP/BICC call control signaling from the external GSTN networks (not shown). It also controls the media gateway (MGW) 148 that provides user-plane interworking functionality (e.g., converting between AMR- and PCM-coded voice). The MGW 148 also communicates with other IP multimedia networks 154.

Figure 2:
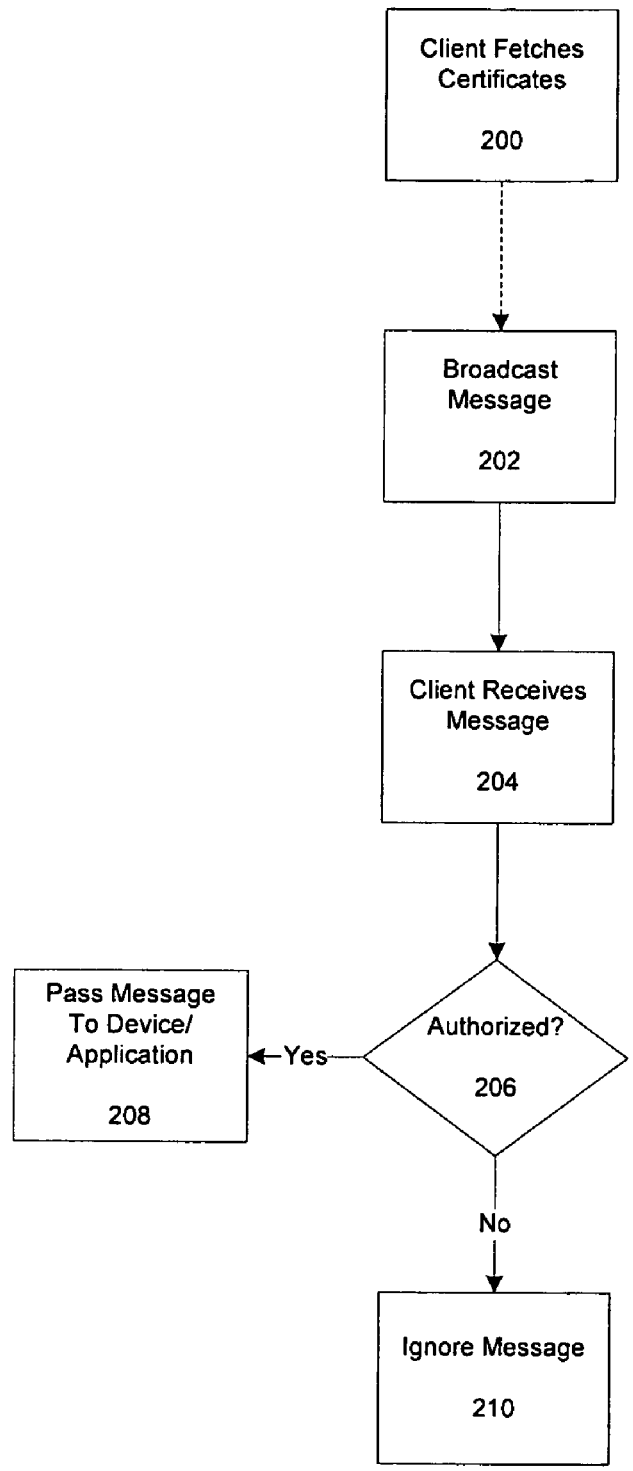
FIG. 2 illustrates exemplary processes performed in accordance with the present invention.

With reference to FIG. 2, there is illustrated the operation of the present invention in greater detail. At step 200, the client 102*a* fetches cryptographic keys/certificates that are used to enable the client 102*a* to decrypt/decode the message in accordance with, e.g., a service subscription, network provider/carrier offering, special event, etc. The keys may be time dependent or stored in such a manner on the MS 102 such that if a customer does not pay for a service or if a promotion ends, the keys expire or are removed. The client 102*a* would then not be able to access subsequent messages, as described below.

The embedded client 102*a* recognizes for which services the customer is provisioned. If the network changes or services are added, the MS 102 and the other network components can be updated via SMS. A device management (DM) message can be sent to the MS 102 using SMS to update the capabilities of the MS 102. The SMSC 109 receives the SMS message to be communicated to update the MS 102. The HLR 112 is interrogated to determine the routing information for the MS 102. The SMSC 109 sends the short message to the MSC 108. The MSC 108 retrieves the customer information from the VLR 114. This operation may include an authentication procedure. The MSC 108 then transfers the short message to the MS 102. The MSC 108 returns the outcome of the operation to the SMSC 109. If requested by the originator, the SMSC 109 may return a status report indicating delivery of the short message.

Using this mechanism, the carrier may repopulate the customer's account with new valid time dependent keys that permit access to the provisioned information and/or services. With the appropriate provisioning, it would then be possible to receive web pages and other information contained in the cell broadcast.

At step 202, the CBC 133 transmits a broadcast message to the BSC 106. The message is preferably encrypted or protected via a rights management system. The BSC 106 communicates the message via the BTS 104, which is received by each MS 102 that is able to hear the message.

At step 204, the client 102*a* receives the message and processes it to determine if the embedded client 102*a* (or application 102*b*) is able to decrypt or authorize the message (step 206). If the client 102*a* is authorized or able to decrypt the message, then at step 208, information received in the message is provided to the application 102*b* or device 102*c*. The cell broadcast messages are formatted to be readable by, e.g., the application 102*b* or device 102*c*. If a particular MS 102 does not have a client 102*a*, or if the client 102*a* does not have authorization to decode/decrypt the message, the MS 102 will ignore the message (step 210).

According to the example above, navigation software residing on the MS 102 receives the information in the cell broadcast. The cell broadcast may contain lat/long information, an identifier of a particular road, a time, where incidents are located, a direction, an estimate of how long the incident will take to clear up, an estimate of a back-up associated with the incident, etc. The navigation software may inform a subscriber what to do and how to navigate, such as which lane to get into, how to avoid an accident, alternate routes, etc. Also, as noted above, the cell broadcast can be forwarded to another device 102*c*, such as a car, personal computer, etc. so applications can be run on other devices than a mobile station 102.

Other applications 102*b*/devices 102*c* may perform functions such as making requests to cars regarding maintenance records. A car dealer, for example, may request that all of the cars sold by the dealership send maintenance records. Insurance companies may make the same request to see how many miles the car has been driven in the year to make sure that the car owner is keeping in line with its lease contractual obligations. State agencies can make a broadcast to a car to determine what the car's emissions are. Taxi companies can broadcast to cabs to pick up a person at a location and find the closest available car to make the call. For each of the specific uses, different cryptographic keys are provided. Thus, different keys would be used by the taxi company than the car dealer, etc. to decrypt and authenticate the appropriate broadcast.

Thus, a network operator or carrier may provide traffic alerts or other information for a fee. If a customer subscribes to this service, the client 102*a* in the customer's MS 102 may receive a certificate/cryptographic key related to this service that will allow the client 102*a* to decode the messages containing content related to the service. The messages may be multi-part. For example, a first encoded/encrypted XML document may be received that is decoded/decrypted by the client 102*a*. The client 102*a* may then make a request to receive more information, such as a streaming download to display the weather for that location.

While the present invention has been described in connection with the preferred embodiments of the various Figs., it is to be understood that other similar embodiments may be used or modifications and additions may be made to the described embodiment for performing the same function of the present invention without deviating therefrom. For example, one skilled in the art will recognize that the present invention as described in the present application may apply to any environment, whether wired or wireless, and may be applied to any number of such devices connected via a communications network and interacting across the network. Therefore, the present invention should not be limited to any single embodiment, but rather should be construed in breadth and scope in accordance with the appended claims.

What is claimed:

1. A method of receiving of a communication at a mobile station communicatively connected to a wireless network, said mobile station uniquely identifying a subscriber associated with said mobile station and having an embedded client for communicating with a client application related to a specific authorized service for said subscriber, said embedded client being configured to fetch one of a key and a certificate for said specific authorized service via a short message service communication, said method comprising:

running said client application within said mobile station, said client application being related to said specific authorized service and being configured to receive a cell broadcast message via said embedded client, said cell broadcast message being formatted to be readable by said client application;

receiving authorization from a service provider for said uniquely identified subscriber to receive said specific authorized service at said embedded client, said specific authorized service being offered by said service provider;

receiving a cell broadcast communication at said embedded client from said service provider connected to said wireless network, said cell broadcast communication being directed to all mobile stations within a predetermined geographic area for receipt at said embedded client;

forwarding information contained in said broadcast communication to said client application in accordance with said authorization for said specific authorized service; and responsive to receiving authorization from said service provider, connecting said mobile station to a device depending on said specific authorized service of said service provider; and forwarding said information to said device.

2. The method of claim 1, wherein said receiving authorization further comprises said service provider providing said mobile station a cryptographic key associated with said specific authorized service responsive to said fetching by said embedded client by said short message service.

3. The method of claim 2, further comprising expiring said cryptographic key at a predetermined time.

4. The method of claim 2, further comprising decrypting said communication using a cryptographic key stored in said mobile station to obtain said information.

5. The method of claim 1, wherein said connecting is performed via a Bluetooth short-range wireless connection.

6. The method of claim 1, further comprising:
accessing, by said device, a Subscriber Identity Module (SIM) in said mobile station to uniquely identify said subscriber; and directing further communication from said service provider to said device based on said subscriber's identity.

7. A method of providing information via an embedded client of a mobile station having a subscriber identity module to an application running on a device communicatively connected to a wireless network, comprising:
receiving a broadcast communication at said embedded client from said wireless network, said broadcast communication being directed to a predetermined geographic area of said mobile station;
authorizing, by a service provider for providing service to said device, a receipt of said broadcast communication by said application running on said device responsive to a subscriber identity maintained in said subscriber identity module; and providing near real time information in accordance with data within said broadcast communication for use by said device.

8. The method of claim 7, said authorizing further comprising:
providing to said embedded client a cryptographic key associated with said service to enable decryption for said device; and
decrypting said broadcast communication using said cryptographic key.

9. The method of claim 7, further comprising:
extracting said near real time information from said broadcast communication;
populating said application running on said device with said near real time information; and
presenting said near real time information to an end user of said device and said mobile station, said end user being identified by said Subscriber Identity Module.

10. The method of claim 9, further comprising pushing said broadcast communication to said application running on said device.

11. The method of claim 7, further comprising:
retrieving said near real time information in accordance with a request in said broadcast communication; and
forwarding said near real time information to the application running on said device via said wireless network.

12. The method of claim 7, further comprising running a different client application for a different service provided by a different service provider in said mobile station via said embedded client of said mobile station.

13. The method of claim 7, further comprising:
connecting said device to said mobile station having said Subscriber Identity Module (SIM) via a short-range wireless link; and
forwarding said information to said device by accessing said SIM via a short-range wireless link.

14. A system for delivering content from a plurality of different service providers via a wireless network to an embedded client of a mobile station using a broadcast mechanism, comprising:
a push proxy gateway (PPG) for receiving content from said plurality of different service providers;
a short message peer to peer (SMPP) router that receives SMPP messages comprising short message service messages from said push proxy gateway and converts said SMPP messages to cell broadcast messages;
a cell broadcast center, responsive to receive of said cell broadcast messages from said SMMP router for communicating said cell broadcast messages to a plurality of mobile stations in a specified area; and
said embedded client of said mobile station for receiving and decrypting said cell broadcast messages in accordance with one of a fetched cryptographic key and a fetched certificate for a particular service of a particular service provider and delivering said cell broadcast messages to a client application if present and authorized to receive said cell broadcast messages, said client application being provided to one of said mobile station and a device communicatively connected to said embedded client of said mobile station of said wireless network to receive said cell broadcast messages.

15. The system of claim 14, wherein said cell broadcast messages are encrypted with one of a different cryptographic key and a certificate fetched by said embedded client that is specific to a service provided by each of said plurality of different service providers.

16. The system of claim 15, wherein said embedded client receives said cryptographic key and passes said cryptographic key to said client application of said one of said mobile station and said communicatively connected device, said client application being configured to receive said cryptographic key to decrypt said cell broadcast messages.

17. The system of claim 14, wherein said client application, if present, resides in said one of said mobile station and said communicatively connected device.

18. The system of claim 17, wherein said device is communicatively connected to said mobile station by a short-range wireless communication link, and wherein said cell broadcast messages are forwarded to said device via said short-range wireless communication link.

19. The system of claim 17, wherein said device is connected to said mobile station via a short-range wireless communication connection, and wherein said device accesses a Subscriber Identity Module (SIM) in said mobile station to enable said device to pull information from said mobile station.

20. The method of claim 1, wherein the embedded client is an embedded JAVA client.

21. The method of claim 7, wherein the embedded client is an embedded JAVA client.

22. The system of claim 14, wherein the embedded client is an embedded JAVA client.

23. A method of receiving a communication at a mobile station communicatively connected to a wireless network, said mobile station uniquely identifying a subscriber associated with said mobile station and having an embedded client for communicating with a client application related to a specific authorized service for said subscriber, said embedded client being configured to fetch one of a key and a certificate for said specific authorized service via a short message service communication, said method comprising:

connecting to a device associated with said uniquely identified subscriber by a short-range communications link, the device being related to said specific authorized service and being configured to receive a cell broadcast message via said embedded client, said cell broadcast message being formatted to be readable by said device;

receiving authorization from a service provider for said uniquely identified subscriber to receive said specific authorized service at said embedded client, said specific authorized service being offered by said service provider;

receiving a cell broadcast communication at said embedded client from said service provider connected to said wireless network, said cell broadcast communication being directed to all mobile stations within a predetermined geographic area for receipt at said embedded client; and forwarding information contained in said broadcast communication to said device application in accordance with said authorization for said specific authorized service.

24. The method of claim 23, wherein said receiving authorization further comprises said service provider providing said mobile station a cryptographic key associated with said service specific authorized service responsive to said fetching by said embedded client by said short message service.

25. The method of claim 24, further comprising expiring said cryptographic key at a predetermined time.

26. The method of claim 23, further comprising decrypting said communication using a cryptographic key stored in said mobile station to obtain said information.

27. The method of claim 23, wherein said connecting is performed via a Bluetooth short-range wireless connection.

28. The method of claim 23, further comprising:

accessing, by said device, a Subscriber Identity Module (SIM) in said mobile station to uniquely identify said subscriber; and directing further communication from said service provider to said device based on said subscriber's identity.

\* \* \* \* \*